March 6, 1962 A. M. SPIELBERG ETAL 3,024,445
INFORMATION TRANSFERRING SYSTEM
Filed Oct. 18, 1956
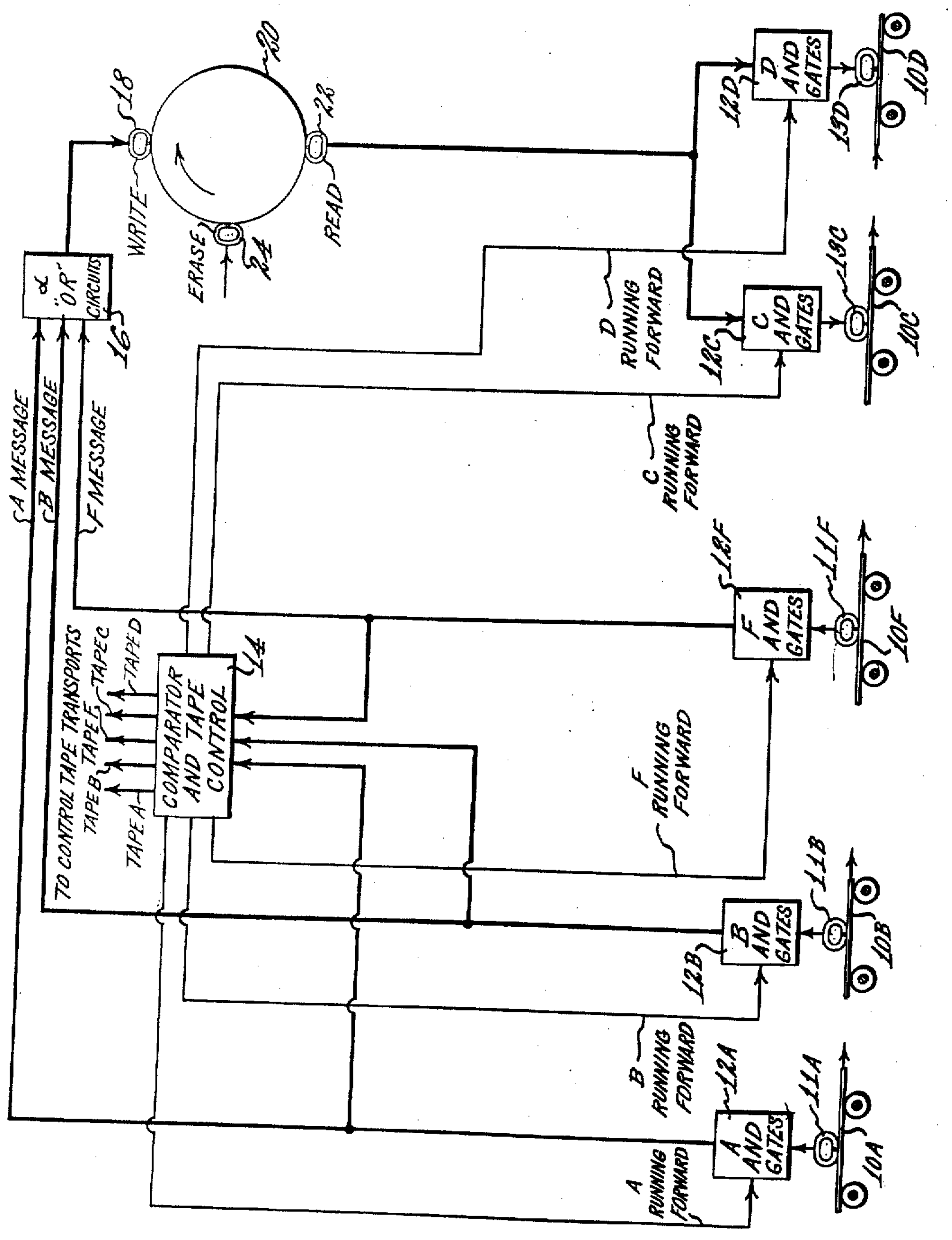
INVENTOR.
JOHN F. PAGE &
ARNOLD M. SPIELBERG
BY Morris A. Rabkin
ATTORNEY 3,024,445
Patented Mar. 6, 1962

3,024,445

INFORMATION TRANSFERRING SYSTEM

Arnold M. Spielberg, Haddonfield, and John F. Page, Barrington, N.J., assignors to Radio Corporation of America, a corporation of Delaware Filed Oct. 18, 1956, Ser. No. 616,843
4 Claims. (Cl. 340—172.5)

This invention relates to information handling systems, and particularly to an information transferring system for a data processing machine.

In many data processing systems, large volumes of recorded information are transferred between storage media. Data processing machines or special purpose computers are known to the art which may take information from input storage devices and sort, merge, and extract information on separate output storage media. Such data processing machines have been described, for instance, in a copending application of William R. Ayres and Joel N. Smith, Serial No. 440,645, filed July 1, 1954, now U.S. Patent No. 2,911,622 and entitled "Serial Memory," and assigned to the assignee of the present invention.

In the arrangement described in that application, information is transferred selectively from an input storage device to an output storage device, preferably magnetic tapes. To accomplish the transfer of information with little waste of time, the magnetic tape transport devices are equipped with two read-write heads designated respectively the α head and the β head.

The so-called α heads are used to read an initial portion of a message encoded on tape. The initial message portion signals are applied to a decision-making unit of the data processing machine which provides tape control signals. A portion only of each message, that portion called the criterion, is read, and a tape control decision is generated. One of the input tape messages is then immediately transferred to the output tapes through the β head.

In certain information handling systems, several magnetic tape machines may be used to save the time consumed in manually transferring reels of magnetic tape from a storage area to a tape transport mechanism and the additional time lost in mounting and threading the tape. A basic configuration might provide three input and two output tapes. A telephone-type switching system quickly connects any of the tape machines to the data processing machine in a "ready-to-use" condition.

There are, however, certain data processing operations during which one input tape may run almost continuously or may be stopped infrequently. It would be desirable, from a cost standpoint, to eliminate the β heads and associated circuitry on the tape transport mechanisms carrying tapes that are rarely interrupted in operation.

It is, therefore, an object of the present invention to provide an information transferring means which accomplishes a function of a second, or β head for magnetic tape transport units having one read-write head.

It is a further object of the invention to effect an economic saving by providing an interim storage means in a data processing system utilizing a less expensive magnetic tape transport device than used heretofore.

Another object of the invention is to provide an information transferring means for connection to tape transport mechanisms having one read-write head in a data processing machine which requires input from two read-write heads.

It is a still further object of the present invention to provide a single information transferring means which may serve the function of the so-called β reading head for several magnetic tape transport units, saving costs in the leads, amplifiers, cables, and switching circuitry, as well as in the heads.

In a preferred embodiment, according to the present invention, a storage device having a capacity normally less than a complete message, is connected to a source of input messages and provides an interim delay before transferring messages to an output storage device. The storage device may be any known type of non-cyclical buffering store, but preferably is a magnetic drum. Since drums are normally cyclical, an erasing head is placed in the path of the recording channel at a point after the reproducing head and before the recording head relative to the direction of travel of the magnetizable surface. A closed tape loop on a tape machine having write, read, and erase heads may also be used. Information read from an input tape is written directly on the drum surface. The message is then read from the drum into the output circuits and the drum is erased. Inasmuch as the drum serves only as an interim store, timing channels are unnecessary and the choice of a drum velocity is not critical.

Information from the input source, which may be a magnetic tape, is transferred to the drum and to decision-making elements of the data processing machine. These decision-making elements generate input and output tape control signals during the time interval between the writing of a character on the drum and the reading of the same character.

Should the decision-making elements signal to transfer the message of the input tape currently in motion to an output tape, the entire message is written onto the drum and the reading heads of the drum transfer the message to a selected output device. Should the decision-making elements select a message on another input tape, the non-selected input tape is stopped with only a portion of its message on the drum and the output tape is stopped at the completion of the message in transit. The recorded portion of the non-selected message is detected at the reading heads and may appear on the output line, but is not applied to an output recording device and is erased at the erasing heads. The output tape is started after the selected message is written on the drum but before the message is detected at the drum read heads.

Whenever an input tape is stopped during the reading of a message, a back-up cycle which may be built into the logical circuitry operates to reverse the tape until the start of the same message is detected. The tape is then stopped in position to read the complete message when the message is run in the forward direction.

The invention may be best understood by reference to the detailed description when read in connection with the drawing, in which the sole figure is a block diagram of a preferred embodiment of a circuit according to the present invention.

In data processing systems, information may be represented by a time succession of different signals occurring in a plurality of signal channels. Each character may be represented by a unique simultaneous combination of signals in parallel channels. Characters may be put together to form words and messages by the successive presentation of the groups of independent signal combinations.

The binary system of notation is well known as one of many systems in which information may be represented. Each binary combination of distinctive signals representing the binary ones and zeros may, therefore, be presented simultaneously in several parallel channels or sequentially in the same channel.

In the circuit of FIGURE 1, information signals are recorded on input data units, for example, magnetic tapes, indicated as A tape 10A; B tape 10B; and F tape 10F. Although three tapes are shown, any number may be used. Information is placed in several, for example, seven, parallel information channels and the circuitry of each channel is the duplicate of that of each other channel. Two output tapes are provided, C tape 10C and D tape 10D, upon which information is written in rearranged order.

Sets of reading heads 11A, 11B, 11F at the respective input magnetic tape transport devices detect signals from corresponding tapes 10A, 10B, 10F, and apply these signals respectively to each gate of the sets of corresponding two-input "and" gates 12A, 12B, 12F. Each set of "and" gates 12 includes a two-input "and" gate for each information channel. Thus, the set of two-input A "and" gates 12A represents a set of seven individual two-input "and" gates.

The sets of "and" gates 12 are each enabled by a control signal from a comparator and tape control unit 14. A set of gates 12 is enabled when the respective tape is running in the forward direction. The enabling or "running forward" signal is derived within the comparator and tape control unit 14 from a combination of signals having a predetermined relation to the tape control signals last provided by the unit 14.

The comparator and tape control unit 14 may be a device which provides an operator with a visual presentation of the contents of each of the input tapes. The operator may then select which of the input messages to transfer and an output tape or tapes to which the message should go. A mechanized comparator and tape control device is disclosed in the copending application of Howard P. Guerber and Stephen M. Fillebrown, filed December 29, 1955, Serial No. 556,128, entitled "Sorting Device," assigned to the assignee of the present invention, which shows tape control logic circuitry for a sorting operation. Computers are known which may be programmed to perform the comparison and tape control functions.

The comparator and tape control unit 14 receives input signals from the input "and" gate sets 12A, 12B, and 12F, and from these information signals generates tape control signals which are applied to the transport mechanisms of the tapes 10A, 10B, 10F, 10C, and 10D.

The outputs from the input tape "and" gate sets 12A, 12B, and 12F, are also applied to a set of α "or" circuits 16. The α "or" circuits 16 include seven three-input "or" circuits. The output of the α "or" circuits 16 is applied to a seven-channel line which is connected to a set of write heads 18 associated with a storage device, preferably a magnetic drum 20.

The magnetic drum 20 has the set of seven write heads 18, seven corresponding read heads 22, and seven corresponding erase heads 24. The erase heads 24 are placed in advance of the write heads 18 so that information is written and erased during the same drum revolution.

The information is written on the drum in parallel drum channels, each corresponding to an information channel on the tape. The set of seven read heads 22 reads the information signals from the seven drum channels and transmits the signals to the gates of two sets of seven, two-input "and" gates 12C and 12D. Thus, each signal is applied to two gates, one of the C gates of the set 12C, and one of the D gates of the set 12D.

The comparator and tape control unit 14 applies the other input to each of the C gates 12C, C running forward signal, and the other input to each of the D gates of the set 12D, the D running forward signal. Thus, the C and D "and" gates 12C, 12D are selectively enabled by tape running forward signals from the comparator and tape control unit 14.

The seven outputs of the set of C gates 12C are applied respectively to the seven heads of a set of write heads 13C; the seven outputs of the set of D gates 12D are applied respectively to the seven heads of a set of write heads 13D. The heads of the set 13C apply the signals received by them to the C tape 10C; the heads of the set 13D apply the signals received by them to the D tape 10D.

In operation, the comparator and tape control unit 14 may be a portion of a data processing machine (not shown) which selects an input tape for operation; for example, the A tape, 10A. The A tape, 10A starts running. A running forward signal is generated and applied from the comparator and tape control unit 14 to the A "and" gates 12A. The read heads 11A detect information characters on the tape 10A and transmit these characters as signals through the enabled A "and" gates 12A to the comparator and tape control unit 14 and through the α "or" circuits 16 to the drum write heads 18.

A first part of the message, called the criterion, is now written, character by character, onto the drum 20.

In the time interval needed for an element of the drum surface to travel from the drum write heads 18 to the drum read heads 22, the comparator and tape control unit 14 examines the criterion of the incoming message, performs internal comparisons, and generates tape control signals to select, for example, the A tape 10A and the C tape 10C. The C tape transport mechanism is energized by signals from the comparator and tape control unit 14 which then applies the running forward signal as an enabling signal to the C "and" gates 12C. The A tape 10A continues to run, and the entire message is transcribed onto the drum.

The drum read heads 22 receive the message from drum 20 and transmit the message through the enabled C "and" gates 12C into the C output tape write heads 13C. The message is thereby transferred to the C output tape 10C from the A input tape 10A through the drum 20.

While the A message is being transcribed onto the C output tape 10C, a new, second A message is presented to the A input reading heads, 11A. The new A message criterion is applied to the comparator and tape control unit 14 and the α "or" circuits 16. The comparator and tape control unit 14 now examines this new message and further internal comparisons are made.

A new decision is made which may, for example, stop the A tape 10A and run the B tape 10B instead. Suitable input tape control signals are then provided to the respective input tape transport mechanisms. At the same time, an output tape is selected and a tape control signal is provided to stop the C tape at the conclusion of the A message and start the selected output tape at a time slightly before the emergence of the B message from the drum reading heads 22.

If the C output tape 10C is selected to receive the new message, it is restarted. If, however, the decision is to select the D output tape, then the comparator and tape control unit 14 generates signals to start the D tape prior to the emergence of the new B message from the magnetic drum read heads 22.

To accomplish this D tape selection, the C tape is stopped at the end of the message which disables the "C" "and" gate 12C. The "D" "and" gate 12D is not yet enabled, since the D tape has not yet been signalled to start. The initial, criterion portion of the second A message, written on the magnetic drum 20 during the transfer of the last characters of the first A message by the read heads 22, is detected by the read heads 22 at a time when neither the C "and" gates 12C nor the D "and" gates 12D are enabled. The criterion portion of the non-selected A message is erased at the drum erase heads 24.

The entire new B message is written on the drum 20 following the criterion portion of the non-selected A message. Slightly before the B message reaches the drum read heads 22, the D output tape 10D starts and the D running forward signal enables the D "and" gates 12D. The entire B message is now transferred to the D output tape 10D.

In other embodiments of the present invention, it is possible to use other forms of non-cyclical storage as well as varying numbers of input and output devices. For instance, other static or dynamic storage elements may be used if provision is made for read-out at a predetermined time after the write-in. For example, sonic delay lines, magnetic cores, or even perforated tape, may be used.

The magnetic drum used in the present invention need not have timing tracks or high linear speed so long as the speed is constant. Furthermore, the drum need not have capacity for storing an entire message, but only that portion of the message containing the message criterion, the identifying information upon which decisions are based. The drum, therefore, may be small, inexpensive, and rugged, and is, therefore, preferred.

Thus, there has been shown a means for selectively transferring information messages between input and output devices which provides time in which to make selections during the course of the message transfer.

What is claimed is:

1. A data processing system comprising, in combination a plurality of input storage devices, each for storing a plurality of messages and each message including an identifying criterion at the start of the message; a plurality of output storage devices; a temporary storage device which is common to a plurality of said input storage devices; means for applying the criterion of a message on one input storage device to the temporary storage device; and means for examining the criterion during the period it is being applied to the temporary storage device and, if it is a desired criterion, selecting an output storage device, and reading the criterion and the message which follows the criterion into the selected output storage device, and if it is not a desired criterion, selecting a desired input storage device, and applying a message from the selected input storage device to the temporary storage device and from the latter to a selected output storage device.

2. A data processing system comprising, in combination, a plurality of input storage devices, each for storing a plurality of messages and each message including an identifying criterion at the start of the message; a plurality of output storage devices; a temporary storage device which is common to all of said input storage devices; means for applying the criterion of a message on one input storage device to the temporary storage device; means for examining the criterion during the period it is being applied to the temporary storage device and, if it is a desired criterion, reading the criterion and the message which follows the criterion into the selected output storage device, and if it is not a desired criterion, selecting a desired input storage device, and applying a message from the selected input storage device to the temporary storage device and from the latter to a selected output storage device and means for erasing the temporary storage device after the information temporarily recorded thereon is applied to said selected output storage device.

3. In a system as set forth in claim 2, said input and output storage devices comprising magnetic tapes and said temporary storage device comprising a drum.

4. A data processing system comprising, in combination, a plurality of input storage devices, each for storing a plurality of messages and each message including an identifying criterion at the start of the message; a plurality of output storage devices; a temporary storage device which is common to all of said input storage devices having a capacity sufficient to store a criterion but not a complete message and including recording means, reading means, and means for erasing the recorded information after it passes the reading means and before it reaches the recording means; means for applying the criterion of a message on one input storage device to the temporary storage device; and means for examining the criterion during the period it is being applied to the temporary storage device and, if it is a desired criterion, selecting an output storage device, and reading the criterion and the message which follows the criterion into the selected output storage device, and if it is not a desired criterion, selecting a desired input storage device, and applying a message from the selected input storage device to the temporary storage device and from the latter to a selected output storage device.

References Cited in the file of this patent

UNITED STATES PATENTS

| | | |
|---|---|---|
| 2,674,733 | Robbins | Apr. 6, 1954 |
| 2,718,356 | Burrell et al. | Sept. 20, 1955 |
| 2,719,965 | Person | Oct. 4, 1955 |
| 2,764,463 | Lubkin et al. | Sept. 25, 1956 |
| 2,798,216 | Goldberg | July 2, 1957 |
| 2,901,732 | Canning | Aug. 25, 1959 |

OTHER REFERENCES

Volume III of 340–174.13, Theory and Techniques of Electronic Digital Computers, Moore School of E.E.U. of Pa., June 30, 1948 (Lecture 22).